United States Patent
Okita et al.

(10) Patent No.: US 7,817,233 B2
(45) Date of Patent: Oct. 19, 2010

(54) OCB-MODE LIQUID-CRYSTAL DISPLAY DEVICE

(75) Inventors: Mitsutaka Okita, Ishikawa (JP);
 Kazuhiro Nishiyama, Ishikawa (JP);
 Daiichi Suzuki, Miyagi (JP); Shigesumi Araki, Ishikawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 948 days.

(21) Appl. No.: 11/616,644

(22) Filed: Dec. 27, 2006

(65) Prior Publication Data

US 2007/0164966 A1  Jul. 19, 2007

(30) Foreign Application Priority Data

Dec. 28, 2005 (JP) ............................. 2005-380219
Dec. 8, 2006  (JP) ............................. 2006-331832

(51) Int. Cl.
 *G02F 1/1335*  (2006.01)
 *G02F 1/133*   (2006.01)
 *G09G 3/36*    (2006.01)

(52) U.S. Cl. ........................... 349/117; 349/33; 345/98
(58) Field of Classification Search ................. 349/33; 345/98
 See application file for complete search history.

(56) References Cited

U.S. PATENT DOCUMENTS

2003/0122767 A1*  7/2003  Nakao et al. ............... 345/96

FOREIGN PATENT DOCUMENTS

| JP | 2000-284298 | 10/2000 |
|----|-------------|---------|
| JP | 2001-281707 | 10/2001 |
| JP | 2005-234376 | 9/2005  |

OTHER PUBLICATIONS

Machine-translation of JP2005-234376.*

* cited by examiner

*Primary Examiner*—David Nelms
*Assistant Examiner*—W. Patty Chen
(74) *Attorney, Agent, or Firm*—Oblon, Spivak, McClelland, Maier & Neustadt, L.L.P.

(57) ABSTRACT

In an embodiment of the invention for an OCB (Optically Compensated Bend)-mode liquid-crystal display (LCD) device, retardation and/or a predetermined voltage range, from which a voltage applied to pixels in a viewing area is selected, is set for the each pixel or for the pixels in each region of the viewing area such that: the luminance on each pixel monotonously increases or decreases with increase of voltage in the predetermined voltage range; the luminance in central portion of the viewing area becomes minimum at black displaying.

12 Claims, 6 Drawing Sheets

PRIOR ART

OCB-MODE LIQUID-CRYSTAL DISPLAY DEVICE

CROSS-REFERENCE TO RELATED APPLICATIONS

This application is based upon and claims the benefit of priority from the prior Japanese Patent Application No. 2005-380219, filed on Dec. 28, 2005, and the prior Japanese Patent Application No. 2006-331832, filed on Dec. 8, 2006; the entire contents of which are incorporated herein by reference.

FIELD OF THE INVENTION

The present invention relates to a liquid-crystal display device of an OCB (Optically Compensated Bend) mode.

BACKGROUND OF THE INVENTION

Recently, the liquid-crystal display (LCD) devices of the OCB mode are developed in addition to those of a TN (Twisted Nematic) mode (see JP-A-2001-281707, JP-A-2005-234376, for example).

Figure 7:
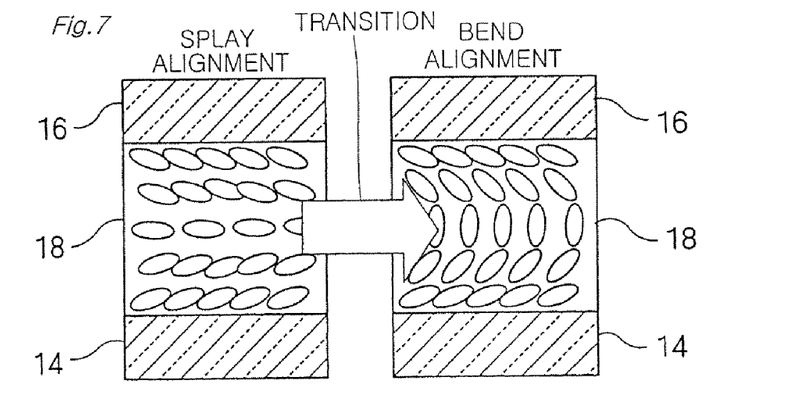
FIG. 7 schematically illustrates transition from a splay alignment state to a bend alignment state in an OCB-mode liquid-crystal display device.

When to display images on the liquid-crystal display device of the OCB mode, it is necessary to transform an arrangement state of an OCB liquid crystal molecules, from a splay alignment state to a bend alignment state as shown in FIG. 7, and to keep the bend alignment state for a while.

Reverse transition to the splay alignment state is prevented by applying a high voltage at a predetermined duration ratio in each of video frames. Visibility of the video image is known to be also improved when, as the high voltage for preventing the reverse transition, black-displaying voltage is applied as to achieve an insertion of black fractional frame in the each video frame.

Figure 8A:
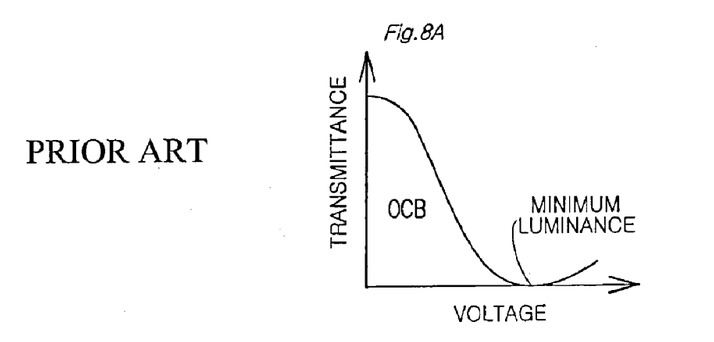
FIG. 8A is a graph showing a luminance-voltage characteristic in a conventional TN-mode liquid-crystal display device.

When an image-displaying screen (viewing area) on display panel of the LCD device of the TN mode is viewed from a substantially perpendicular direction, a luminance decreases monotonously with increase in an applied voltage, and exhibits no particular voltage for minimizing the luminance; as no "minimal or local minimal value" is shown in a voltage-luminance curve in FIG. 8A for example. Therefore, no gray-scale inversion takes place and hence no significant deterioration of the visibility takes place so long as the display panel is viewed from a substantially perpendicular direction; even when the voltage-luminance curve varies or deviates within a viewing area on the display panel due to variation such as that of the thickness of the liquid crystal layer within the viewing area.

Figure 8B:
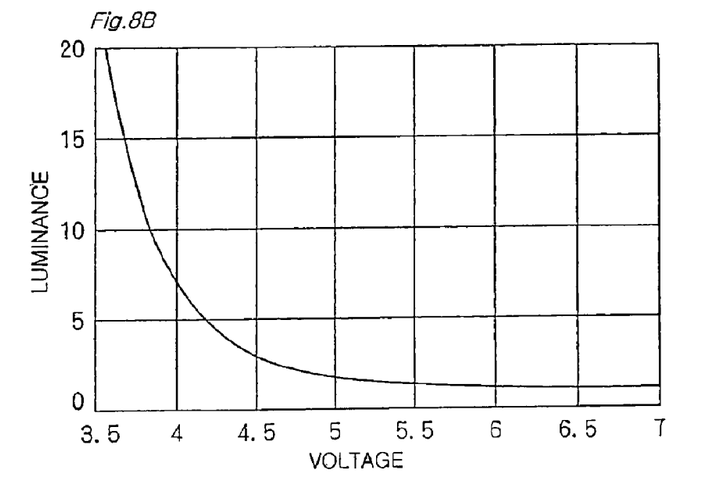
FIG. 8B is a graph showing a luminance-voltage characteristic in an OCB-mode liquid-crystal display device.

On contrary, a voltage-luminance curve for the OCB-mode LCD device, when an image-displaying screen is viewed perpendicularly from the front, assumes a substantially quadratic curve as shown in FIG. 8B for example. Thus, the "minimum or local minimum value" does appear in the voltage-luminance curve. The voltage-luminance curve or performance would vary or deviate within the viewing area; due to the variation of thickness of the liquid crystal layer (referred to "cell gap") within the viewing area of the display panel. Thus, voltages in a range including right-hand and left-hand sides of a voltage for the "minimum or local minimum value" may be applied. Then, gray-scale inversion occurs even when the display screen is viewed perpendicularly, and hence the visibility is deteriorated.

It is aimed in view of the above, to curb gray-scale inversion that otherwise may occur even when the image-displaying screen is viewed perpendicularly, for the OCB-mode LCD device.

BRIEF SUMMARY OF THE INVENTION

An LCD device according to an embodiment of the invention, comprises: a display panel having an array substrate, a counter substrate, an OCB-mode liquid-crystal layer (a layer of liquid crystal material for OCB mode) sandwiched between the array and counter substrates, and a viewing area formed of an array of pixels; a voltage applier that selects at least one voltage from a predetermined voltage range in response to an inputted video signal and apply a selected voltage to the OCB-mode liquid-crystal layer at each of the pixels, as to determine a luminance on the each pixel in response to the inputted video signal; wherein retardation and/or the predetermined voltage range is set for the each pixel or for the pixels in a region of the viewing area such that: the luminance on each pixel monotonously increases or decreases with increase of voltage within the predetermined voltage range; the luminance in central portion of the viewing area becomes minimum at black displaying.

DETAILED DESCRIPTION OF THE INVENTION

Referring now to the drawings, a liquid-crystal display (LCD) device 10 according to an embodiment of the present invention will be described.

FIRST EMBODIMENT

Referring now to FIGS. 1 to 6, the LCD device 10 according to a first embodiment of the present invention will be described. The LCD device 10 in this embodiment is a normally-white OCB-mode LCD device.

(1) Structure of Display Panel 12 in Thickness-Wise Cross Section

Figure 1:
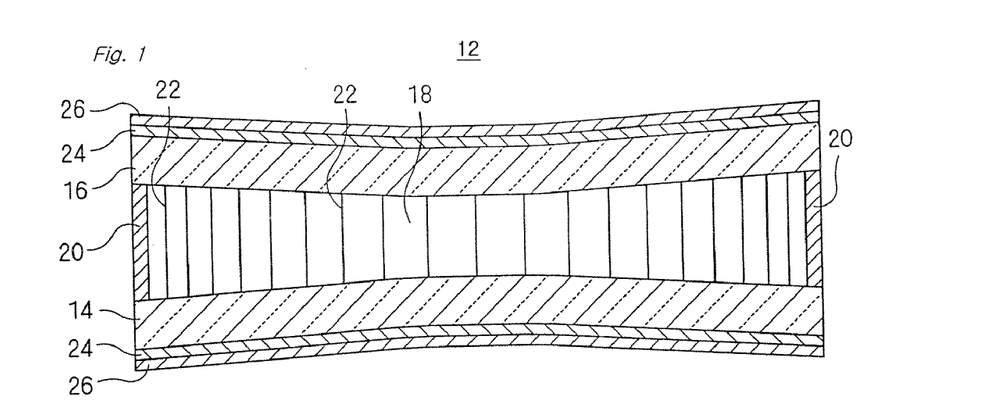
FIG. 1 is a thickness-wise cross-sectional view of a display panel according to a first embodiment of the present invention.

Referring now to FIG. 1, a structure of a display panel 12 of the LCD device 10 in thickness-wise cross section will be described. The LCD device 10 has a viewing area that is surrounded by a pattern of a sealing material 20 and has a diagonal dimension of 32 inches.

An array substrate 14 and a counter substrate 16, each of which is formed of an insulator substrate such as a glass plate and has an inner face having electrode (s), are arranged as overlaid to sandwich a layer 18 of liquid-crystal material for the OCB mode. All-around periphery of the display panel 12 is sealed by the sealing material 20, at between the array substrate 14 and the counter substrate 16. The thickness of the liquid crystal layer 18 is controlled by column spacers 22 formed on the array substrate 14. Rubbing processing is applied to the array substrate 14 and the counter substrate 16 where rubbing directions are arranged in parallel between the substrates; and the liquid crystal molecules of the liquid crystal layer 18 have a pre-tilt angle of about 10 degrees. Thickness of the liquid crystal layer 18 in central portion of the display panel 12 is set to be thinner than that in the end portion (in vicinity of all-around fringe of an image-displaying screen, that is, a viewing area). Thus, thickness of the end portion of the display panel 12 is set to be thicker than that in the central portion. Construction enabling this and reasons for this will be described later.

A retardation plate 24 (half-wave plate, quarter-wave plate etc.) and a polarizer plate 26 are attached onto reverse or outer face of the array substrate 14. For example, the retardation plate 24 having a hybrid-aligned discotic liquid crystal material is preferable. The retardation plate 24 and the polarizer 26 are attached also onto obverse or outer face of the counter substrate 16.

(2) Electrical Arrangement of LCD Device 10

Figure 2:
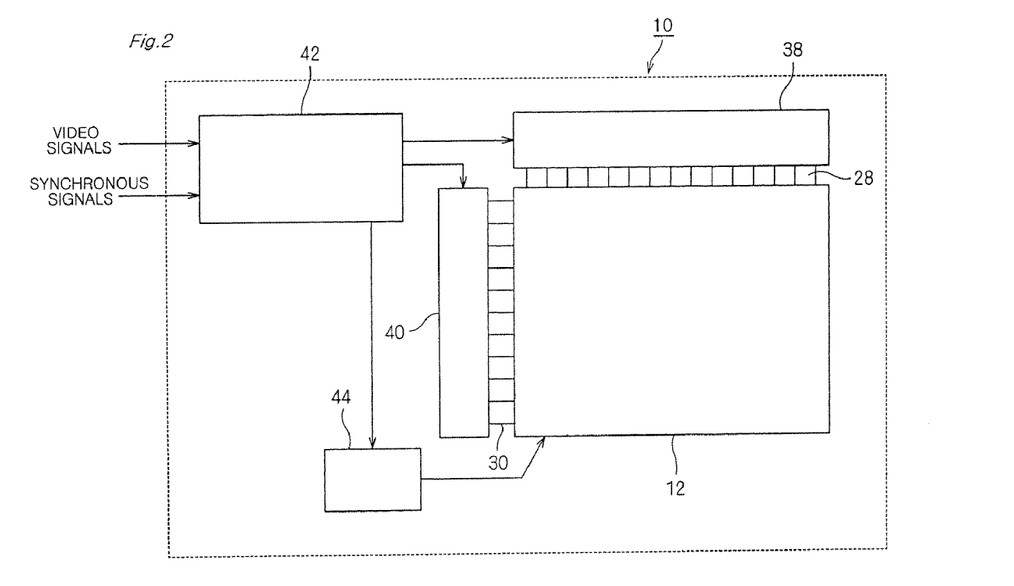
FIG. 2 is a block diagram of a liquid-crystal display device.
Figure 3:
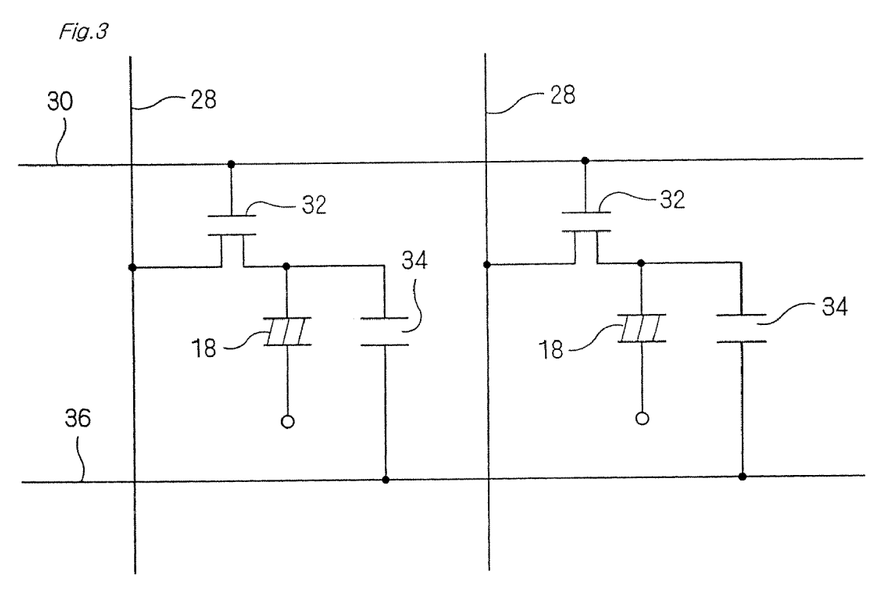
FIG. 3 is a circuit diagram showing a construction of each pixel.

Referring now to FIG. 2 and FIG. 3, an electrical arrangement of the LCD device 10 will be described.

In FIG. 2, a signal line drive circuit 38 and a scanning line drive circuit 40 are connected to the display panel 12. More specifically, signal lines 28 are connected to the signal line drive circuit 38; and scanning lines 30 and storage capacitor lines 36 are connected to the scanning line drive circuit 40.

The LCD device 10 includes a controller 42. The controller 42 supplies signals such as horizontal synchronous signals, digital video signals and horizontal start signals to the signal line drive circuit 38; and supplies signals such as vertical synchronous signal and vertical start signals to the scanning line drive circuit 40; on basis of video signals and synchronous signals supplied from the outside. A counter voltage generating circuit 44 is connected to the controller 42; and the counter voltage generating circuit 44 supplies a counter or common voltage to the counter substrate 16.

The array substrate 14 of the display panel 12 is arranged with the signal lines 28 and the scanning lines 30 extending orthogonally to the signal lines 28, as shown in FIG. 3. Thin film transistor (TFT) 32 having an active layer formed of polysilicon (p-Si) is provided in vicinity of each of intersections of the signal lines 28 and the scanning lines 30. The signal lines 28 are connected to source electrodes of the TFTs 32, and the scanning lines 30 are connected to gate electrodes. Pixel electrodes are connected to drain electrodes of the TFTs 32, so as to apply a voltage at between the counter substrate 16 and the pixel electrodes. The storage capacitor lines 36 are somewhat connected to the drain electrodes of the TFTs 32 via layers forming storage capacities 34.

(3) Black-Displaying Voltage

Figure 4:
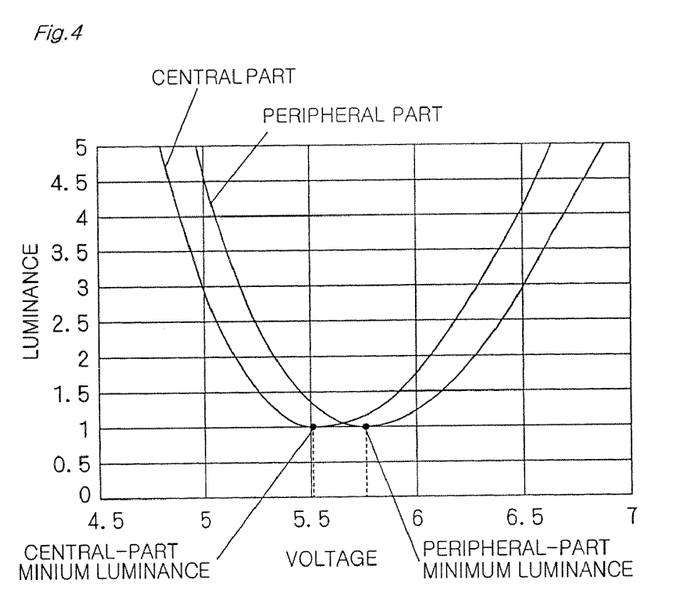
FIG. 4 is a graph showing a luminance-voltage characteristic in the liquid-crystal display device according to an embodiment of the invention.

Referring now to FIG. 4, a black-displaying voltage for achieving a complete black tone on pixels and to be applied to the liquid crystal layer 18 will be described. The black-displaying voltage in this embodiment is a voltage applied to insert or form a fractional frame of black displaying at a certain duration ratio with a fractional frame of image displaying, in each video frame. Such applying of the black-displaying voltage enables maintaining of the bend alignment state of OCB-mode liquid crystal molecules as to prevent reverse transition to the splay alignment state and to improve the visibility of motion pictures as mentioned before. Please see FIG. 7. The black-displaying voltage is also applied when to display a black pattern in a video image.

Retardation in the central portion of the display panel 12 is set so that the black-displaying voltage is substantially equal to a voltage achieving a minimum luminance at the central portion. On contrary, retardation in the end portion of the display panel 12 is set to be different from that of the central portion, in a manner that the voltage achieving a minimum luminance in the central portion is smaller than that in the end portion. In order to realize these, in this embodiment, the thickness of the central portion of the liquid crystal layer 18 and the thickness of the end portion thereof are differentiated as shown in FIG. 1. More specifically, a liquid crystal material whose birefringence ($\Delta n$) is 0.15 is employed; the thickness of the liquid crystal layer 18, which is referred as "cell gap", in the central portion is set to be thinner than that in the end portion; and the thickness gradually decreases with approaching or shifting from the end portion to the central portion. In this embodiment, the thickness in the central portion is set to 4.3 μm and the thickness in the end portion is set to be 4.5 μm so that the difference therebetween is 0.2 μm. Accordingly, the retardation ($\Delta n \times d$ (thickness)) of the display panel 12 is varied step by step or bit by bit as shifting between the central portion and the end portion; and the retardation is larger in the end portion than in the central portion.

By the above, as shown in FIG. 4, the voltage achieving minimum luminance in the central portion of the display panel 12 at the normal temperature is about 5.7 V, while that in the end portion is about 5.9V. Hereinafter, the voltage achieving minimum luminance in the central portion is referred to be central portion minimum-luminance voltage; and that in the end portion is referred to be end portion minimum-luminance voltage.

When the counter voltage is 6.5V for example, the black-displaying voltage was set to be 12.2V or 0.8V in view of common inversion drive (a drive with polarity inversion of the counter voltage), in order to achieve the black-displaying voltage. Then, a voltage substantially at 5.7V, which is the central portion minimum-luminance voltage, is applied to the liquid crystal layer in the central portion, at time of black displaying, whereby a desirable black displaying is achieved.

In the end portion, the black-displaying voltage is slightly lower than the end portion minimum luminance voltage; and thus, luminance or transmittance at time of the black displaying is slightly higher than in the central portion. However, since luminance or transmittance varies gradually from the central portion to the end portion, such variation is not conceived from the image-displaying screen.

By adopting such construction described above as to control retardation of the display panel in the LCD device 10, the gray-scale inversion never appears; because a voltage range in which luminance monotonously decreases with the increase in the applied voltage is employed, for each pixel.

The difference between the black-displaying voltage in the end portion and the end portion minimum luminance voltage is preferably 0.5V or less, and more preferably, no less than 0.1V and no more than 0.3V. In order to achieve such a range of difference in voltage, the difference of the cell gap is, for example, no less than 0.1 µm and no more than 0.5 µm, and more preferably, no less than 0.1 µm and no more than 0.3 µm.

The range shown above might vary slightly depending on the dimensions of the viewing area. However, it does not affect image displaying as long as the diagonal dimension of the viewing area is 10 inches or larger and, more preferably, 15 inches or larger.

Accordingly, the LCD device 10 superior in visibility without generation of the gray-scale inversion even in the end portion as well as in the central portion of the display panel 12 is realized.

(4) First Structural Arrangement for Varying Thickness of Liquid Crystal Layer 18

Figure 5:
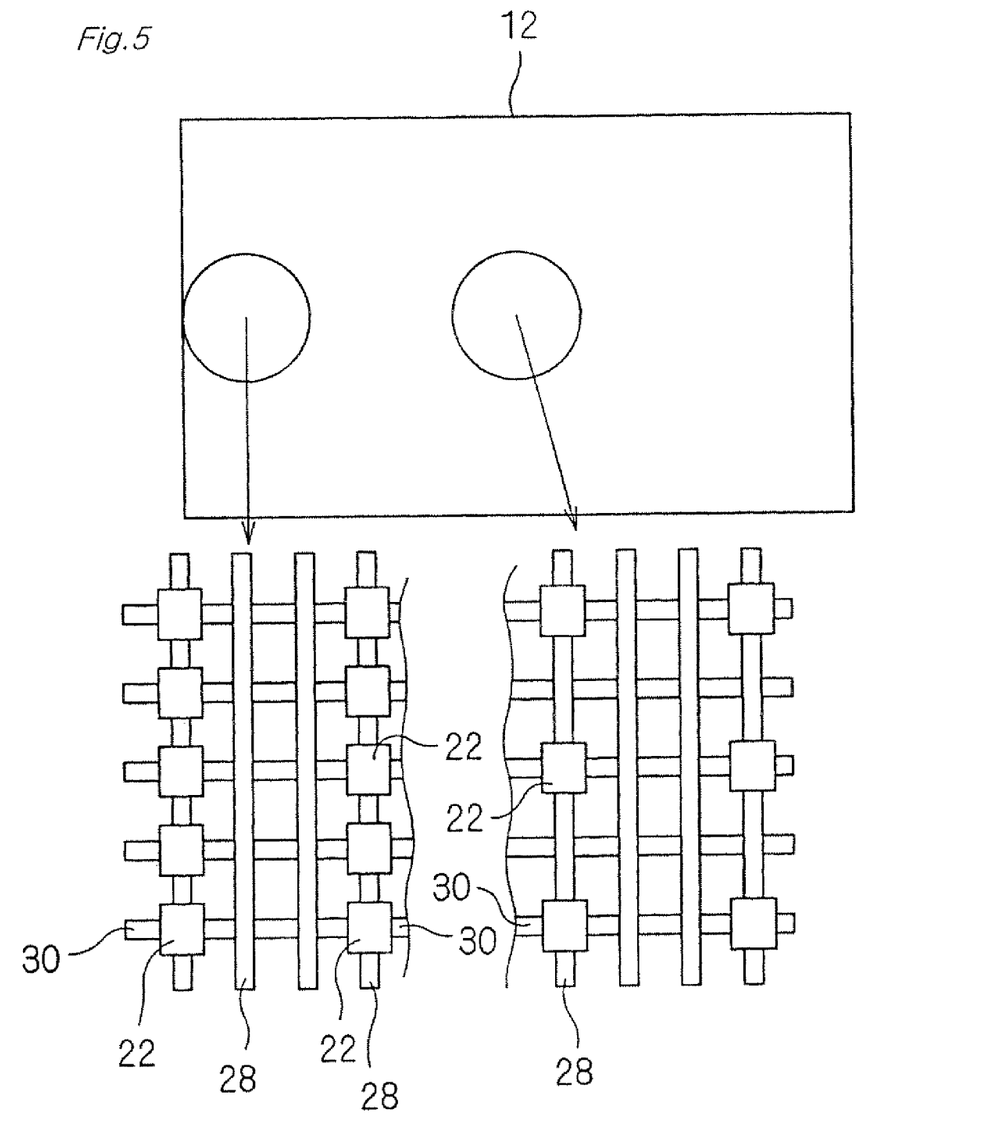
FIG. 5 illustrates a first structural arrangement configured to vary thickness of a liquid crystal layer.

Referring now to FIG. 1 and FIG. 5, a first structural arrangement for achieving the thickness in the central portion thinner than the end portion in the display panel 12 will be described.

An upper part of FIG. 5 is an obverse plan view of the display panel 12, and a lower part is an enlarged plan view showing a state in which the signal lines 28 intersect with the scanning lines 38 orthogonally, and the column spacers 22 are provided at the intersections.

The column spacers 22 are formed of photosensitive resin and are patterned by photolithography. As shown in FIG. 5, densities of arranging the column spacers 22 are differentiated between the central portion and the end portion of the display panel 12. In other words, the density of arranging the spacers in the end portion in vicinity of the fringe of the image-displaying screen is larger than that in other regions. Accordingly, an extent of compression deformation of the column spacers 22 in the end portion is smaller than that of the other regions; and hence the thickness in the end portion becomes larger than in the central portion.

Accordingly, as described above, the thickness in the central portion of the display panel is reduced in comparison with the end portion.

(5) Second Structural Arrangement for Varying Thickness of Liquid Crystal Layer 18

Figure 6:
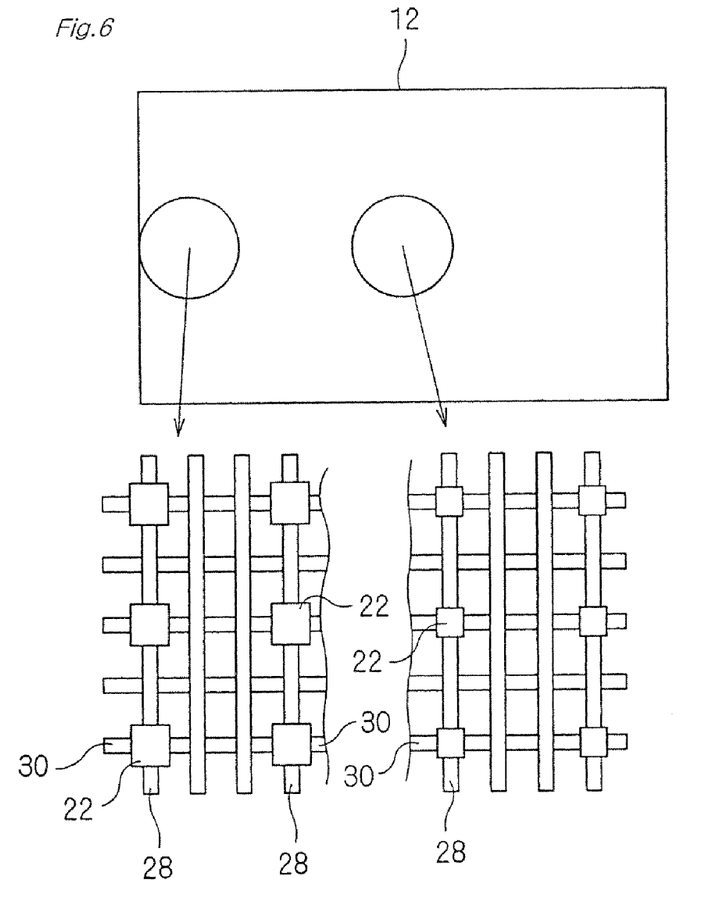
FIG. 6 illustrates a second structural arrangement configured to vary thickness of a liquid crystal layer.

Referring now to FIG. 6, a second structural arrangement for varying the thickness of the liquid crystal layer 18 will be described.

An upper part of FIG. 6 is an obverse plan view of the display panel 12, and a lower part is an enlarged plan view showing a state in which the signal lines 28 intersect with the scanning lines 38 orthogonally, and the column spacers 22 are provided at the intersections.

In the second structural arrangement, diameters or widthwise dimensions of the column spacers 22 in the central portion, which is here a part of the viewing area other than the end portion in vicinity of the fringe, is are set to be smaller than those in the end portion; so as to achieve a relatively large extent of compression deformation of the column spacers 22 in the central portion.

In this manner, by making the diametrical dimensions of the column spacers 22 in the central portion to be smaller than those in the end portion, the extent of compression deformation becomes large; and hence the thickness of the display panel 12 in the central portion is reduced in comparison with the end portion thereof.

(6) Third Structural Arrangement for Varying Thickness of Liquid Crystal Layer 18

A third structural arrangement for varying the thickness of the liquid crystal layer 18 will be described.

The third structural arrangement is a combination of the first and second structural arrangements shown above. In other words, the density of arranging the column spacers 22 and the diametrical dimensions of the column spacers 22, in the end portion, are set to be larger than those in remaining regions within the viewing area. Alternatively, the density of arranging the column spacers 22 and the diametrical dimensions of the column spacers, in the central portion or a very center region here, 22 may be set to be smaller than those in remaining regions within the viewing area.

(7) Modifications

The present invention is not limited to the embodiments shown above, and may be modified in various manners without departing from the scope of the invention.

For example, in the end portion in vicinity of the all-around fringe of the viewing area, an insulator film of about 0.1 µm in thickness may be provided as a base layer for the spacer.

The black-displaying voltage is adjusted to be substantially the same as the central portion minimum luminance voltage in the above described embodiment. Nevertheless, the black-displaying voltage may be set to be slightly lower than the central portion minimum luminance voltage, by considering the variation in thickness of the liquid crystal layer, which is arisen at the time of manufacture. However, a contrast as viewed perpendicularly from the front may be lowered if the black-displaying voltage is excessively lowered than the central portion minimum luminance voltage. Therefore, preferably, the black-displaying voltage does not exceed 0.3 V. Accordingly, even when the cell gap in the central portion is varied because of variations in manufacturing processes, generation of undesired gray-scale inversion is prevented with high degree of reliability since; only a range of the voltage-luminance curve, on one side of minimum luminance voltage, in which luminance of pixels monotonously decreases with increase in applied voltage, is employed.

In the embodiments described above, the black-displaying voltage is used as a reverse transition preventing voltage. However, the voltage level may be varied with temperature variation as long as the reverse transition is effectively prevented. The reverse transition preventing voltage may be a high voltage exceeding a voltage which demonstrates a minimal display luminance.

SECOND EMBODIMENT

Figure 9:
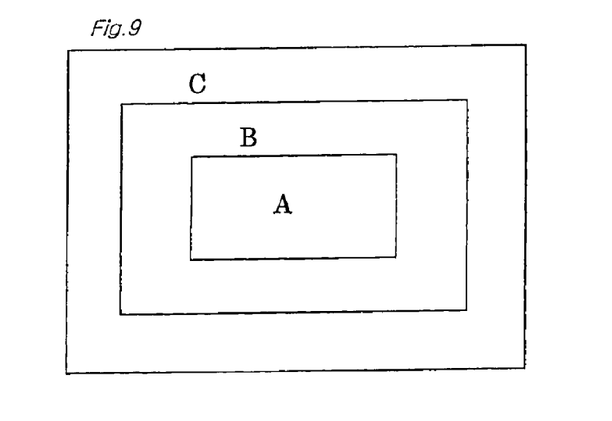
FIG. 9 is an explanatory plan view of the display panel according to a second embodiment of the invention.
Figure 10:
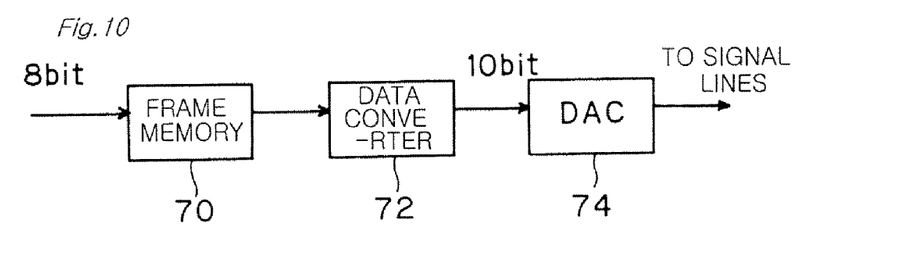
FIG. 10 is a block diagram of a circuit construction for processing a video signal according to the second embodiment.
Figure 11:
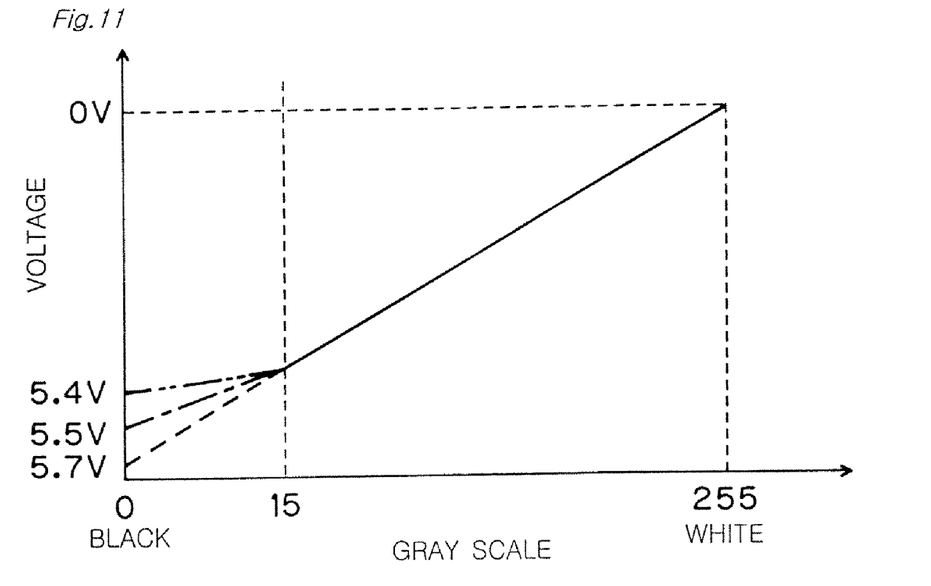
FIG. 11 is a graph showing a voltage-gray-scale characteristic according to the second embodiment.

Referring now to FIG. 9 to FIG. 11, a second embodiment of the present invention will be described.

In the first embodiment, the retardation of the display panel in the display area is increased gradually from an optimal value from the central portion to the end portion by differentiating the cell gap between the central portion and the end portion of the viewing area.

Alternatively, in the second embodiment, the substantially equivalent advantageous effect as the first embodiment is achieved by adjusting a range of voltage applied at pixels, which is outputted to the pixels corresponding to video signal supplied from the outside.

In other words, the voltage range is separately set for each region of the viewing area; so that luminance on pixels in the central portion becomes substantially the minimum luminance at the time of black-displaying; and so that the luminance of each pixel monotonously decreases within the voltage range even though there are variations in thickness of the liquid crystal layer due to manufacturing processes.

A method to achieve the aforementioned setting will be described below.

As shown in FIG. 9, the viewing area is divided into three regions; and, for example, a central rectangular region whose diagonal dimension is 8 inches, which corresponds to ¼ or smaller with respect to the viewing area is designated as an area A; an intermediate or rectangular ring region that has a diagonal dimension of 30 inches and excludes the region A is designated as a region B; and the remaining end region is designated as a region C. Values of voltage, which are respectively applied to the regions at the time of low level gray-scale (black or near-black) display, are differentiated between the regions.

More specifically, the LCD device 10, being different from the first embodiment, as shown in FIG. 10, includes; a frame memory 70 that stores 8-bit video signals supplied from the outside signal source; a data converting unit 72 that converts the video signal read from the frame memory 70 into 10-bit video signal on basis of a conversion table or a conversion formula, accordingly to each of the regions; and a DAC (digital/analogue converter) 74 that outputs a corresponding analogue voltage to each of the signal lines on basis of the 10-bit video signal outputted from the data converting unit 72.

An example of the conversion table or the conversion formula stored in the data converting unit 72 is shown in FIG. 11. For 16 gray-scale levels ranging from 0 to 15, the conversion is made as to differentiate the outputted voltage among the regions A, B and C, even though the gray scale is same among the regions A, B and C.

A broken line shown in FIG. 11 represents a gray scale-voltage conversion for the central region A; and the voltage in the range from 0V to 5.7V is outputted according to the video signals. The voltage of 5.7V matches a minimum luminance voltage of the display panel. When considering the variations arisen in manufacturing process, the voltage would become 5.6V for example, which is slightly shifted from the minimum luminance voltage.

A dot-dash line in FIG. 11 represents the gray scale-voltage conversion for the intermediate region B; and the voltage in the range from 0V to 5.5V is outputted. The gray scale-voltage conversion for the center region B differs from that for region A only in a voltage range corresponding to the gray scale from 0 to 15.

A dot-dot-dash line in FIG. 11 represents the gray-scale voltage conversion for the end region C; and the voltage in the range from 0V to 5.4V is outputted. The gray scale-voltage conversion for the end region C differs from that for the central region A and from that for the intermediate region B, only in a voltage range corresponding to the gray-scale levels from 0 to 15.

By the above, the advantageous effect equivalent to that of the first embodiment is obtained.

The equivalent advantageous effect is also obtainable when average values of the applied voltage for a plurality of the video frames are differentiated among the regions A, B and C, by the Frame Rate Control (FRC) technique; other than the above technique, in which the voltage applied to the liquid crystal layer according to the video signals, which represent gray-scale levels, are differentiated among the regions A, B and C. By using the FRC Technique, the equivalent advantage is obtained without increasing the number of gray-scale voltages.

The adjustment of gap in the first embodiment may also be employed simultaneously.

According to the second embodiment, an excellent black-displaying is achieved in the central portion of the viewing area. Even when the cell gap is varied due to variations in manufacturing process, gray-scale inversion is prevented with high degree of reliability since; only a range of the voltage-luminance curve, on one side of minimum luminance voltage, in which luminance of pixels monotonously decreases with increase in applied voltage, is employed.

THIRD EMBODIMENT

A third embodiment of the invention will be described.

In the third embodiment, the same advantageous effect as the above-described embodiments is achieved by varying extents of the retardation of the retardation films, such as half or quarter wave plates, which are attached respectively to regions of the viewing area on of the display panel.

For example, the advantageous effect as the above is achieved by setting the retardation of the retardation plate for the regions A, B and C in FIG. 9, as follows; 60 nm for the central region A, 57 nm for the intermediate region B, and 56 nm for the end region C.

Such a retardation adjustment is achieved when consecutively attached in following order are; a first retardation plate covering whole of the viewing area; a second retardation plate covering the intermediate region B and the central region C; and third retardation plate only covering the central region C. In this embodiment as well, the above-described manner of voltage application and/or the adjustment of the cell gap may also be employed, in same time.

The OCB-mode LCD device may have a voltage range from 6V to 12V to be applied at pixels, instead of the above range. When such higher voltage range is adopted, constructions of the aforementioned embodiments are somewhat reverse as follows. The cell gap is set to be decreased gradually from the central portion to the end portion; the voltage applied at the time of black displaying is set to be increased gradually from the central portion to the end portion; and/or the retardation by the retardation plate is set to be increased gradually from the central portion to the end portion. In any of these constructions, the luminance in the central portion at the time of black displaying is substantially a minimal value; and voltages higher than the minimal value are applied to remaining part.

By the present embodiment and its modifications, the advantageous effect as in the above-described embodiments is achieved.

What is claimed is:

1. A liquid-crystal display device comprising:
    a display panel having an array substrate, a counter substrate, an OCB-mode liquid-crystal layer sandwiched between the array and counter substrates, and a viewing area formed of an array of pixels;
    a voltage applier that selects at least one voltage from a predetermined voltage range in response to an inputted video signal and apply a selected voltage to the OCB-mode liquid-crystal layer at each of the pixels, as to determine a luminance on the each pixel in response to the inputted video signal;
    wherein retardation and/or the predetermined voltage range is set for the each pixel or for the pixels in each region of the viewing area such that:
    the luminance on each pixel monotonously increases or decreases with increase of voltage within the predetermined voltage range;

the luminance in central portion of the viewing area becomes minimum value at black displaying; and the retardation in the central portion differs from that in an end portion of the viewing area.

2. The liquid-crystal display device according to claim 1, wherein thickness of the OCB-mode liquid-crystal layer in the central portion differs from that in the end portion.

3. The liquid-crystal display device according to claim 2, wherein thickness of the OCB liquid crystal layer in the end portion is thicker than that in the central portion.

4. The liquid-crystal display device according to claim 2, wherein the display panel includes a plurality of column spacers between the array substrate and the counter substrate to maintain the thickness of the OCB-mode liquid-crystal layer; and wherein a density of arranging the column spacers in the central portion is lower than that in the end portion.

5. The liquid-crystal display device according to claim 2, wherein the display panel includes a plurality of column spacers between the array substrate and the counter substrate to maintain the thickness of the OCB-mode liquid-crystal layer; and wherein diameter of the column spacers in the central portion is smaller than that in the end portion.

6. The liquid-crystal display device according to claim 1, wherein the display panel includes a retardation plate arranged at least on one main surface; and the retardation realized by the retardation plate in the central portion differs from that in the end portion.

7. The liquid-crystal display device according to claim 6, wherein the retardation realized by the retardation plate in the end portion is smaller than that in the central portion.

8. A liquid-crystal display device comprising:

a display panel having an array substrate, a counter substrate, an OCB-mode liquid-crystal layer sandwiched between the array and counter substrates, and a viewing area formed of an array of pixels;

a voltage applier that selects at least one voltage from a predetermined voltage range in response to an inputted video signal and apply a selected voltage to the OCB-mode liquid-crystal layer at each of the pixels, as to determine a luminance on the each pixel in response to the inputted video signal;

wherein retardation is set so that; a voltage achieving a minimum luminance of the pixels in the end portion when applied thereto is larger than a voltage achieving a minimum luminance of the pixels in the central portion when applied thereto.

9. The liquid-crystal display device according to claim 8, wherein thickness of the OCB liquid crystal layer in the end portion is thicker than that in the central portion.

10. The liquid-crystal display device according to claim 8, wherein the display panel includes a plurality of column spacers between the array substrate and the counter substrate to maintain the thickness of the OCB-mode liquid-crystal layer; and wherein a density of arranging the column spacers in the central portion is lower than that in the end portion.

11. The liquid-crystal display device according to claim 8, wherein the display panel includes a plurality of column spacers between the array substrate and the counter substrate to maintain the thickness of the OCB-mode liquid-crystal layer; and wherein diameter of the column spacers in the central portion is smaller than that in the end portion.

12. A liquid-crystal display device comprising:

a display panel having an array substrate, a counter substrate, an OCB-mode liquid-crystal layer sandwiched between the array and counter substrates, and a viewing area formed of an array of pixels;

a voltage applier that selects at least one voltage from a predetermined voltage range in response to an inputted video signal and apply a selected voltage to the OCB-mode liquid-crystal layer at each of the pixels, as to determine a luminance on the each pixel in response to the inputted video signal;

wherein a voltage applied to the pixels in the central portion at a time of displaying black images achieves a minimum luminance of the pixels in the central portion and is set to be larger than a voltage applied to the pixels in the end portion at the time of displaying black images.

* * * * *